United States Patent Office 3,767,821
Patented Oct. 23, 1973

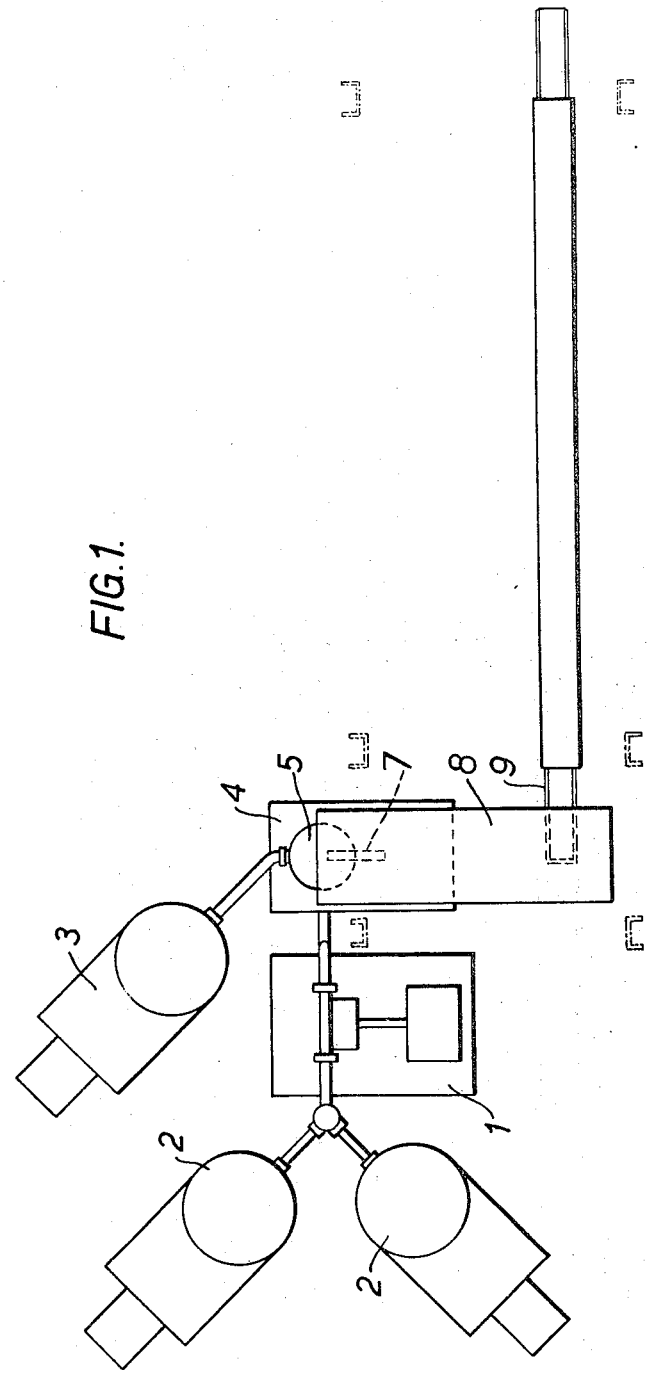

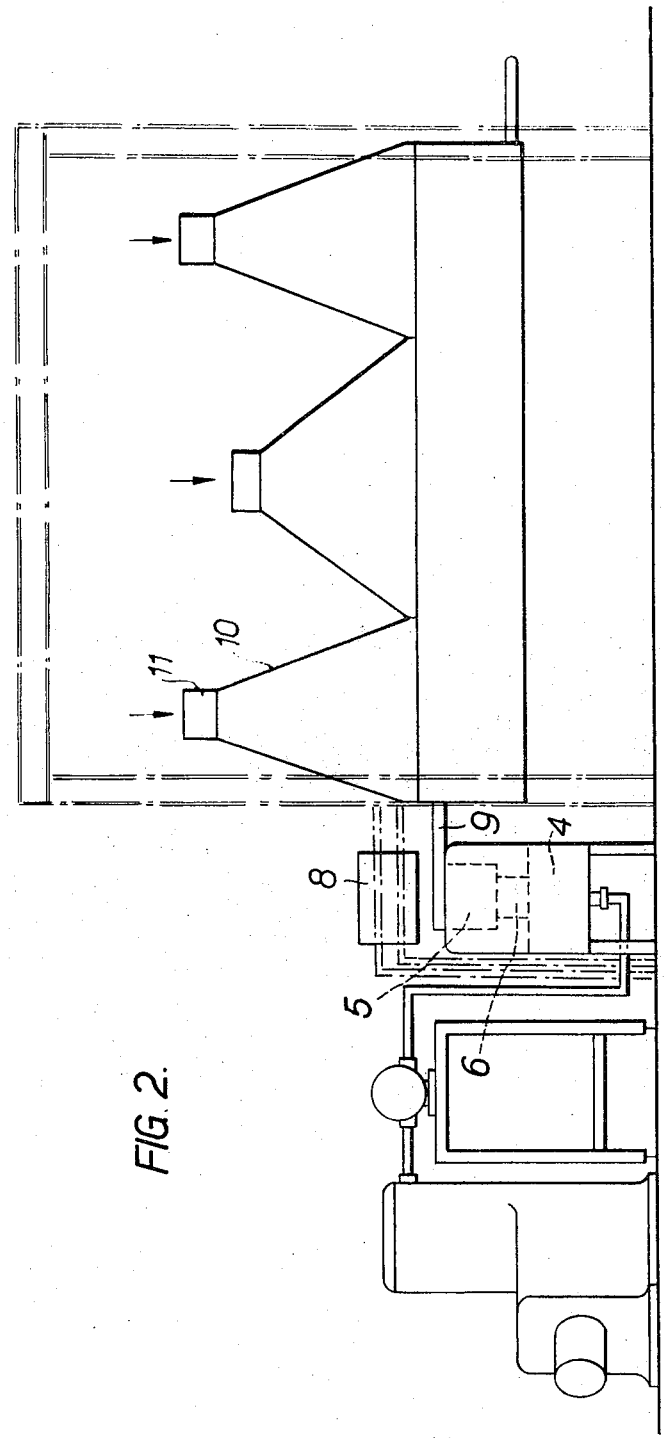

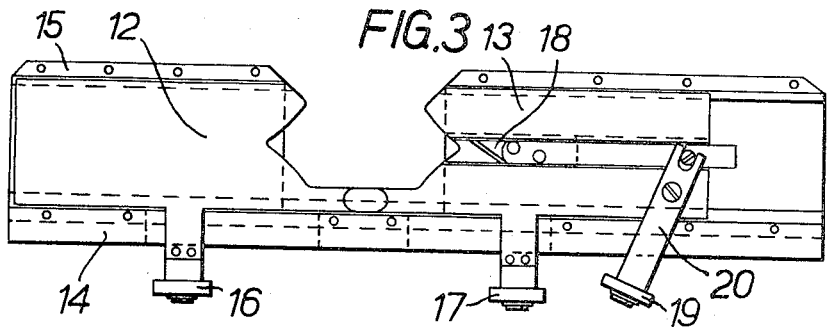
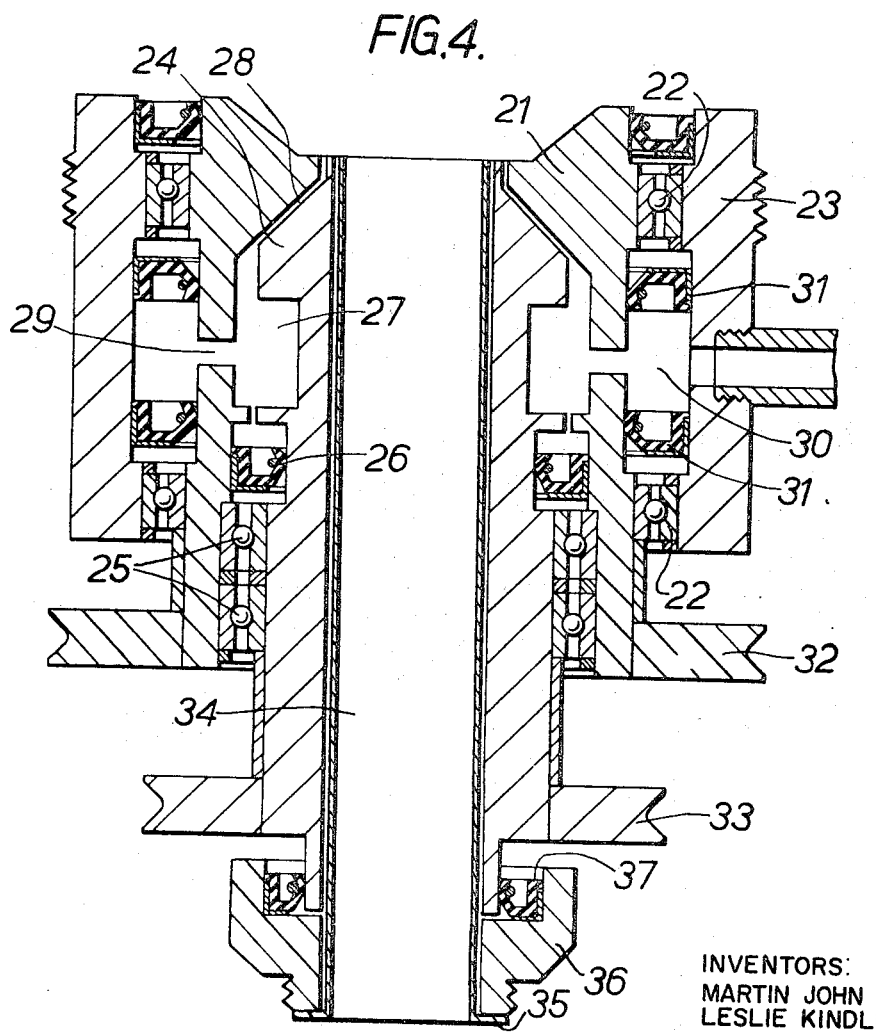

3,767,821
METHOD OF MAKING A COLLAGEN-COATED SAUSAGE
Martin John Deacon, Higham Ferrers, and Leslie Kindleysides, Rushden, England, assignors to Lever Brothers Company, New York, N.Y.
Filed June 10, 1971, Ser. No. 151,668
Claims priority, application Great Britain, June 16, 1970, 29,151/70
Int. Cl. A22c *11/00;* A23b *1/00*
U.S. Cl. 426—276
5 Claims

ABSTRACT OF THE DISCLOSURE

The collagen coating of a collagen-coated foodstuff, such as collagen-cased sausage, tends to disintegrate when the foodstuff is cooked in a humid environment. The stability of such coatings is improved by incorporating in them a thermally gelling non-ionic cellulose ether, such as methyl cellulose.

---

This invention relates to coated foodstuffs, and more particularly to foodstuffs having a coating of collagen, such as collagen-cased sausages.

The manufacture of foodstuffs with a coating of collagen instead of more conventional coatings has a number of advantages, particularly when manufacture is carried out by an extrusion process such as is described and claimed in our British Pat. 1,232,801. One deficiency however, is that if the products are cooked in a humid environment, the collagen undergoes hydrolysis to gelatin; and the mechanical weakening of the coating that may then occur can result in the appearance of the cooked product being spoiled. For example, when sausages having a collagen coating are cooked in a batter, or fried in a closed pan, or grilled packed too close together, the gelatinisation that takes place often leads to disintegration of the coating.

The present invention is based on our discovery that, by incorporating a thermally gelling non-ionic cellulose ether such as methyl cellulose in the collagen coating, the resistance of the coating to such disintegration is improved.

The non-ionic cellulose ether may form from 1 to 50% by weight of the solids of the coating, and preferably forms from 5 to 20% by weight thereof.

As already indicated, methyl cellulose (i.e. a methyl ether of cellulose) is particularly suitable for use according to the invention. Another suitable material is the hydroxyalkyl ether of cellulose known as hydroxypropyl methyl ether. This has in common with the methyl ether the property of being thermally gelling, that is to say, of precipitating from aqueous solution when the temperature is raised above about 60° C. It may well be that the improved stability to heat and humidity that these non-ionic cellulose ethers bring about is due to physical interaction between the collagen and the cellulose ether that becomes precipitated on cooking.

Foodstuffs having a collagen coating containing the cellulose ether can be made by extruding upon the foodstuff a dough of collagen in tubular form, the dough being one in which the cellulose ether is incorporated. Preferably, a process generally in accordance with that described in our British Pat. 1,232,801 is employed, according to which one or both surfaces of the collagen dough are subjected during extrusion to frictional forces acting in a direction about the axis of extrusion.

The frictional forces are best applied by relative rotational movement between inner and outer members of a die through which the collagen dough is extruded. Preferably the movement is provided by rotation of the inner and outer members of the die in opposite senses.

In a particularly preferred process, sausage meat or other extrudable foodstuff, particularly foodstuff to be fried such as hamburger, or beefburger mix or a cheese/potato mix, is shaped to receive the cellulose-ether-containing collagen dough by extrusion simultaneously with it, for example through an axial bore in the inner member of the die mentioned above. The bore is conveniently of the same cross-section as the coated food product being prepared.

The collagen can be set by methods known in the preparation of artificial sausage casing. Conveniently, extrusion takes place into a setting bath, containing for example common salt brine. Under the influence of the setting solution the collage is coagulated, precipitated or otherwise set in contact with the extruded foodstuff, and the formed length of coated foodstuff then emerges from the bath to undergo any further process steps required. Usually the product will require drying to a point at which the moisture content of the coating is below 40% by weight or other steps to bring the collagen from the set but still wet condition to a handleable state. Preferably, the coated foodstuff after setting of the collagen in a salt setting solution is simply dried in the presence of the salt taken up from the setting solution, preferably by forced blast air drying.

In the process of the invention the raw materials are collagen dough in which a thermally gelling non-ionic cellulose ether has been incorporated, and a foodstuff mix, for example pork or beef sausage meat.

The collagen dough can be prepared by procedures known in themselves, but most conveniently by the procedure described in our British Pat. 1,232,801. After inclusion in it of the cellulose ether used according to the present invention, the viscosity of the dough will usually be from 45 to 90 poises.

The collagen solids content is corresponding preferably 4.0 to 7.4%, most advantageously 4.5 to 5.5%.

The plant described in our British Pat. 1,232,801 as suitable for use in performing the invention of that patent may also be used in carrying out the present invention. It is described again here, with reference to the accompanying drawings, in which:

FIG. 1 is a diagrammatic plan of the plant;
FIG. 2 is a diagrammatic elevation;
FIG. 3 is a diagrammatic view of a crimper/cutter; and
FIG. 4 is a section of the extruder used in the plant.

In the drawings, 1 is a constant-displacement metering pump for sausage meat fed by two sausage stuffers 2 of conventional type working through a change-over valve so that while one is being filled, the other is delivering and continuous delivery to the extruder can be maintained. The collagen dough containing the cellulose ether is fed to the extruder by a stuffer 3. In the extruder, which is described in more detail later, the sausage meat and the collagen dough are extruded simultaneously, so that a continuous sausage is formed with a collagen coating on it.

In the extruder unit and its associated setting bath 4 is the support and drive-motor stand of conventional construction, and 5 is the setting bath, in the bottom of which the extruder 6 is mounted. Brine is circulated to the setting bath by means not shown.

The continuous collagen coated sausage emerging from the setting bath passes over a wheel 7 to a conveyor 8 on which it is lightly held by the crimper/cutters described later. The conveyor allows draining of excess setting solution back into the bath, and while the sausage is on the conveyor 8 the setting solution is able to act a little longer on the casing before individual sausages are separated and dropped onto the next conveyor 9. The procedure does not employ the conventional twist linking operation; there is no need for it here.

The conveyor 9, which is of conventional construction, passes through an air drier, in which the air is fed through separate hoods 10 supplied with air by conventional motor-driven fans 11 and designed to give a uniform air flow over the conveyor.

The crimper-cutter (FIG. 3) consists of two V-formed members 12 and 13 sliding in fixed upper and lower guides 14 and 15. A number of crimper-cutters are mounted on the conveyor 8, which is of twin chain construction, and the distance between them determines the length of each sausage. The continuous sausage leaving the wheel 7 is fed into the V cut-outs in the sliding members 12 and 13, and the V's slowly close, under the action of two cams between which the conveyor passes and which act through followers 15 and 17. The V's displace the meat within the coating to form individual sausages with rounded ends until only a thin neck of the coating is remaining. The neck is then cut, to separate individual sausages, by a knife 18 moving forward under the action of another cam on a roller 19 and slotted arm 20. Alternatively, the sliding V members may be made to shear the skin.

The extruder (FIG. 4) has a 45° outer cone 21 carried in ultra-high precision bearings 22 in the head 23, which is screw-threaded for mounting in the bottom of the coagulating or setting bath. An inner cone 24 is carried within the outer one on bearings 25. The two cones constitute an extrusion die, the gap between them being 20 thousandths of an inch (0.5 mm.) A seal 26 is provided between the inner and outer cones and prevents escape of dough from an annulus 27 from which dough passes to the gap 28 between the cones. The annulus 27 is itself fed, through channels 29 in the outer cone, from an annulus 30 which surrounds the outer cone and is sealed by seals 31. Concentric ertensions 32, 33 of the cones take belt drives. Through the centre of the inner cone and its drive extension passes a bore 34. This bore takes a fixed tube 35 for the sausage meat, 0.75 in. (1.9 cm.) diameter, clamped to a flange 36 by a coupling (not shown) on the supply line for the meat. A seal 37 is provided to prevent any escape of setting solution.

In using the plant, extrusion of the collagen dough containing the cellulose ether begins first, and the setting bath is then filled, the die parts being thus protected from blocking by set collagen. When extrusion of the collagen dough is going smoothly the supply of sausage meat is started up, and as soon as a uniform coated product is emerging from the setting bath, the conveyor 8 is brought into action and the product is fed to it. Operation is then automatic.

The invention is illustrated by the following examples.

EXAMPLE 1

100 parts by weight of milled collagen having a solids content of 10% (conveniently prepared following generally the procedure described in Example 1 of our British Pat. 1,232,801 but without the use of glycerol) is mixed in a planetary mixer with 100 parts by weight of the solution obtained by adding 1 part of methyl cellulose to 99 parts by weight of water at 95° C., stirring the liquid at high speed for 3 minutes, and then (still with stirring) cooling it to room temperature. The methyl cellulose employed is one which has about 1.6 methoxy groups per repeating anhydroglucose unit of the cellulose molecule and whose solution in water at 2% concentration and 20° C. has a viscosity (measured by Brookfield viscometer) in the range 350 to 550 cps.

The slurry of collagen containing methyl cellulose is passed twice through a colloid mill, and then converted to an acid-swollen dough of pH 3, apparent viscosity 70 poises, by mixing it in a Hobart planetary mixer, with lactic acid. The dough is then deaerated in a Z-blade mixer under a reduced pressure of approximately 2.5 cm. of mercury, then given a final homogenisation treatment by passage through an Oakes mixer and allowed to stand in chill for 36 hours.

A conventional English sausage meat mix is prepared, such as one composed of the following ingredients:

| | Parts by weight |
|---|---|
| Lean pork meat | 15 |
| Fat pork | 15 |
| Rusk | 4.7 |
| Salt | 0.57 |
| Skim milk powder | 0.9 |
| Water | 9 |
| Seasoning | 0.1 |

The skim milk and half the water are stirred together, then added to the lean meat in a conventional bowl chopper. The mixture is chopped for three minutes, the salt and seasoning and the rest of the water being added as chopping begins and the rusk and fat pork after two minutes.

Co-extrusion of the collagen dough and the sausage meat is then carried out as described earlier. The dough is suitably supplied to the die at 125 p.s.i. (8.75 kg./cm.²). The extrusion rate is suitably 25 ft./min. (12 cm./sec.), the inner and outer cones of the die being rotated in opposite senses, at 70 and 85 r.p.m. respectively. The setting bath used may contain saturated salt brine, brought to pH 10 with ammonia, to a depth of 12 inches (30 cm.).

The continuous sausage produced is cut into sausages 4 inches (10 cm.) long, and these are subjected to a stream of ambient air (flow rate, 2000 ft./min.=10 m./sec.; temperature, 23° C.), with a residence time of 15 minutes, the moisture content of the coating being thus reduced below 40% by weight.

The coating of sausage thus made, after equilibration of salt and moisture content has been allowed to take place, is of good appearance and quality.

The sausages obtained in one typical procedure following the above example were boiled in water for 10 minutes, and the coatings showed none of the local disintegration shown by the collagen coatings of sausages prepared identically but for the omission of the non-ionic cellulose ether from the collagen dough used to form the coatings.

Sausages obtained in the procedure following the example were also compared with some obtained with the use of the ionic cellulose ether sodium carboxymethyl cellulose. The use of this material is described in U.S. Pat. 3,123,483, in the treatment of pre-formed collagen sausage casings to ensure that when stuffed with sausage meat and cooked by frying, they will be stable against breakage or undue shrinkage. The procedure of Example 1 above was repeated exactly except that 1 part of sodium carboxymethyl cellulose of viscosity 15–25 cps. in 1% aqueous solution at 25° C. was substituted for the methyl cellulose ingredient of the collagen dough submitted to coextrusion with the sausage meat. The coatings of the sausages then obtained had poor stability, and disintegrated after only 10–15 seconds immersion in boiling water. A similar poor stability was also shown by coatings in which the sodium carboxymethyl cellulose used was of viscosity 300–450 cps. in 1% aqueous solution at 25° C.

EXAMPLE 2

The procedure of Example 1 was repeated four times with the difference that the grade of methyl cellulose there employed was replaced successively with an equal weight of a different grade, as follows:

| | Approx. number of methyl groups per anhydroglucose unit | Viscosity, cps. (2% aqueous solution at 20° C.) |
|---|---|---|
| Run: | | |
| 1 | 1.6 | 17–23 |
| 2 | 1.6 | 4,000–6,000 |
| 3 | 1.9 | 9–11 |
| 4 | 1.9 | 350–550 |

In each case, the casings obtained had good stability to boiling water.

EXAMPLE 3

The procedure of Example 1 was repeated twice with the difference that the methyl cellulose there employed was replaced successively with an equal weight of hydroxypropyl methyl cellulose, as follows:

| | Approx. number of groups per anhydroglucose unit | | Viscosity, cps. (2% aqueous solution at 20° C.) |
|---|---|---|---|
| | Methoxy | Hydroxypropyl | |
| Run: | | | |
| 1 | 1.5 | 0.3 | 350–550 |
| 2 | 1.5 | 0.3 | 3,000–4,000 |

In both cases, the coatings obtained had good stability to boiling water.

What is claimed is:

1. In a method of making a collagen-coated foodstuff comprising the steps of extruding a collagen dough in tubular form upon the foodstuff to form a coating thereon, setting the collagen coating, and drying the coating to a handleable state, the improvement which consists of incorporating in the collagen dough which is extruded a thermally gelling non-ionic celllose ether selected from the group consisting of methyl cellulose and hydroxypropyl methyl cellulose in an amount forming from 1 to 50 percent by weight of the solids of the coating.

2. A method according to claim 1, in which the thermally gelling non-ionic cellulose ether forms from 5 to 20 percent by weight of the coating solids.

3. A method according to claim 1, in which the cellulose ether is methyl cellulose.

4. A method according to claim 1, in which the cellulose ether is hydroxypropyl methyl cellulose.

5. In a method of making a collagen-coated sausage comprising the steps of extruding a collagen dough in tubular form upon the sausage to form a coating thereon, setting the collagen coating, and drying the coating to a handleable state, the improvement which consists in incorporating in the collagen dough which is extruded a thermally gelling non-ionic cellulose ether selected from the group consisting of methyl cellulose and hydroxypropyl methyl cellulose in an amount forming from 5 to 20 percent by weight of the solids of the coating.

References Cited

UNITED STATES PATENTS

| 3,306,754 | 2/1967 | Kielsmeier et al. | 99—169 |
| 3,471,303 | 10/1969 | Hamdy et al. | 99—166 |
| 3,622,353 | 11/1971 | Bradshaw et al. | 99—169 |

HYMAN LORD, Primary Examiner

U.S. Cl. X.R.

426—302, 321, 332